United States Patent
Starodoumov

(10) Patent No.: US 7,046,432 B2
(45) Date of Patent: May 16, 2006

(54) OPTICAL FIBER COUPLING ARRANGEMENT

(75) Inventor: Andrei Starodoumov, Cupertino, CA (US)

(73) Assignee: Coherent, Inc., Santa Clara, CA (US)

( * ) Notice: Subject to any disclaimer, the term of this patent is extended or adjusted under 35 U.S.C. 154(b) by 158 days.

(21) Appl. No.: 10/774,743

(22) Filed: Feb. 9, 2004

(65) Prior Publication Data
US 2004/0196537 A1 Oct. 7, 2004

Related U.S. Application Data

(60) Provisional application No. 60/446,201, filed on Feb. 11, 2003.

(51) Int. Cl.
*H04B 10/12* (2006.01)
*G02B 6/42* (2006.01)

(52) U.S. Cl. .................... 359/341.32; 385/45

(58) Field of Classification Search .......... 359/341.32, 359/337.11, 341.3; 385/45
See application file for complete search history.

(56) References Cited

U.S. PATENT DOCUMENTS

| | | | | |
|---|---|---|---|---|
| 3,289,101 | A * | 11/1966 | Masters et al. ............. | 372/100 |
| 4,239,960 | A * | 12/1980 | Galluppi ................ | 250/214 VT |
| 5,864,644 | A | 1/1999 | DiGiovanni et al. .......... | 385/43 |
| 5,999,673 | A | 12/1999 | Valentin et al. ............... | 385/43 |
| 6,167,075 | A * | 12/2000 | Craig et al. .................... | 372/75 |
| 6,288,835 | B1 * | 9/2001 | Nilsson et al. ........... | 359/341.3 |
| 6,295,304 | B1 * | 9/2001 | Koch et al. .................... | 372/6 |
| 6,339,495 | B1 * | 1/2002 | Cowle et al. ............ | 359/341.4 |
| 6,359,730 | B1 * | 3/2002 | Tervonen .................... | 359/349 |
| 6,434,295 | B1 * | 8/2002 | MacCormack et al. ....... | 385/27 |
| 6,587,633 | B1 * | 7/2003 | Bagnasco et al. ........... | 385/142 |
| 6,643,059 | B1 * | 11/2003 | Grant et al. ........... | 359/341.32 |
| 6,650,400 | B1 * | 11/2003 | Maroney et al. ....... | 359/337.21 |
| 2002/0008901 | A1 * | 1/2002 | Kinoshita ................ | 359/341.1 |
| 2003/0099439 | A1 * | 5/2003 | Ionov .......................... | 385/48 |
| 2004/0033004 | A1 * | 2/2004 | Welch et al. ................. | 385/14 |
| 2004/0076197 | A1 * | 4/2004 | Clarkson et al. ............... | 372/6 |
| 2004/0218868 | A1 * | 11/2004 | Liu .............................. | 385/45 |
| 2005/0185888 | A1 * | 8/2005 | Willig ......................... | 385/43 |

FOREIGN PATENT DOCUMENTS

WO    WO 00/67350    11/2000

OTHER PUBLICATIONS

Jenny Reinhard, Fundamentals of Fiber Optics—An introduction for beginners, Apr. 26, 2000, Published masters thesis.*
Hecht, Jeff. Understandign fiebr optics 2nd ed. Sams Publishing. 1993 Indianapolis, IN. pp. 209-228.*

* cited by examiner

*Primary Examiner*—Jack Keith
*Assistant Examiner*—Ari M Diacou
(74) *Attorney, Agent, or Firm*—Stallman & Pollock LLP

(57) ABSTRACT

Apparatus for optically pumping a clad amplifier fiber includes one or more transmission fibers arranged and configured to insert pump-light from a pump light source such as a diode-laser into the cladding of the amplifier fiber. The pump light propagates through the cladding and a portion of the pump light is absorbed in the doped core of the amplifier fiber. At least one of the transmission fibers is arranged to receive an unabsorbed portion of the propagated pump light from the amplifier cladding and re-insert the unabsorbed portion of the pump-light into the cladding for re-propagation through the cladding. This provides that pump light that would otherwise be wasted is circulated through the amplifier fiber for further absorption by the amplifier core.

16 Claims, 13 Drawing Sheets tapered part

OPTICAL FIBER COUPLING ARRANGEMENT

PRIORITY

This application claims priority from prior provisional application Ser. No. 60/446,201 filed Feb. 11, 2003 the disclosure of which is incorporated herein by reference.

FIELD OF THE INVENTION

This invention relates to optical fibers and systems containing such optical fibers, and, in particular, to cladding-pumped waveguide and fiber lasers and amplifiers.

BACKGROUND OF THE INVENTION

Cladding pumped (also called double-clad) fiber lasers and amplifiers are good converters of low brightness radiation from laser diodes to a high brightness single-mode radiation. All-fiber construction and the robust monolithic design provide good stability and excellent beam quality thereby making fiber lasers a unique source for many industrial, military, scientific and medical applications.

A typical cladding-pumped fiber comprises a single-mode (or a few mode) core doped with rare-earth ions and a plurality of cladding layers supporting multi-mode pumping light. The inner cladding surrounding the core is typically a silica cladding with a large cross section compared to that of the core. The outer cladding is typically a low-index polymer cladding, or fluorinated silica cladding, or air-silica structure with an effective refractive index less than that of the inner cladding providing a large numerical aperture and guiding properties for the inner cladding. Light from low brightness multimode optical sources such as single laser diodes or diode arrays can be coupled into the inner cladding due to its large cross sectional area and high numerical aperture. Propagating in the inner cladding pumping light is absorbed by the rare-earth ions in the core providing amplification for signals in the single-mode core. With an optical feedback provided by spectrally selective mirrors from both fiber ends (so called linear cavity) the cladding-pumped fiber becomes a laser oscillator at the selected wavelength. Absorption of the pump light in the core depends on the geometry of the fiber and is roughly proportional to the core area-to-inner cladding area ratio. The larger inner cladding area the smaller absorption coefficient at a fixed core area.

A variety of schemes have been suggested for coupling low brightness sources into the inner cladding efficiently. The most common among them are side coupling using a multimode fiber (see, for example, U.S. Pat. No. 5,999,673), etching pits into the double-clad fibers, coupling through a multimode fiber being in optical contact with a doped fiber with parallel surfaces, coupling through a tapered fiber bundle with/or without single mode fiber in the center of the bundle (see, for example, U.S. Pat. No. 5,864,644). All these techniques except the last one permit separation of the signal path of the single-mode core from the pump-launching path which is very important for fiber amplifiers. No technique has been suggested for de-coupling of the pump power from a cladding. The reason is that most of fiber lasers operate in a linear cavity design (Fabry-Perot cavity with two mirrors) and the length of the cavity is typically chosen to absorb more than 90% of the pump power. The length of fiber amplifiers is also optimized to reduce residual pump power to less than 10%. A linear cavity design works well up to laser powers of 100 W. However, with increased pump power handling the residual power becomes an issue.

A major difficulty preventing scaling fiber lasers to high output powers for example, hundreds of watts or kilowatt level, is an efficient coupling of a sufficient number of low brightness sources into the inner cladding. An increase in the cladding area results in a longer pump absorption length and a longer cavity length. In turn, a longer cavity length give rise to nonlinear effects such as Stimulated Raman scattering and stimulated Brillouin scattering that limit the output power of the system. The cavity length can be shorter if a pump-reflecting mirror is placed at the end of the cavity. However, residual pump light reflected from the output coupler in short fibers would likely damage the laser diode pump source.

An alternative to the pump-reflecting mirror is a ring cavity where pump light circulates in the cavity. However, for double-clad fibers there is no an appropriate fiber wavelength-division-multiplexer for constructing a ring cavity, as can be done with single-mode fibers. Use of bulk multiplexers requires polarization control, which is also difficult to achieve in double-clad fibers. The prior art solution for the ring cavity includes a 45° angle-polished fiber output end placed in front of the input end that can re-launch both the signal and pump power into the fiber. This scheme uses bulk elements and requires a number of fine interfaces with associated problems of matching and alignment. As a result, the demonstrated efficiency was lower than in the traditional linear cavity. Accordingly there is a need for a new robust and compact all-fiber design for a cavity with a re-circulating pump.

Another difficulty related to the typical linear cavity design of cladding-pumped fiber lasers is the problem of short wavelength generation in the fluorescence spectrum of fiber lasers. Typically, rare-earth ions in silica exhibit quite broad fluorescence spectrum. For example, fluorescence spectrum of Yb-doped fiber extends from 1020 nm to 1180 nm with a strong separate peak at 976 nm. However, it is very difficult to get efficient generation in the short wavelength part of the spectrum, and especially at 976 nm. The reason is that many rare-earth ions (for example, Tm, Yb, Er at 1535 nm, Nd at 900–940 nm) provide three-level lasing systems. In a three-level system, the lasing occurs from an excited level to either the heavily populated ground state or a closely spaced level separated from it by no more than a few kT. The significant thermal population of the lower lasing level results in re-absorption of light at the laser wavelength. The effect of re-absorption is much stronger at shorter wavelengths because of a smaller energy separation between the lower laser level and the ground state. For three-level or quasi-three-level systems the long cavity length will result in considerable re-absorption and therefore lead to a high threshold and a low efficiency. To reduce re-absorption, an intense pump power should be maintained in the fiber to keep the population inversion relatively high. However, it is difficult to fulfill this requirement for a linear cavity in the whole fiber without loss of conversion efficiency. Thus, a short ring cavity with a re-circulating pump would help to generate light at the short wavelength side of the broadband spectrum for three-level and quasi-three-level transitions.

The Y-doped fiber lasers generating at short wavelengths of their fluorescent spectrum in the range 976–1060 nm attract a lot of attention as a promising pump source for high-powered erbium-doped fiber lasers and amplifiers (1530–1630 nm) or as a pump for Pr-doped lasers and amplifiers (1310 nm region). Using a fiber Raman laser, light from the wavelength region of 980–1060 nm can be efficiently converted to the output wavelength from 1.1 to 1.7 micron. New industrial and military applications also require high power systems at wavelengths near 1 micron. High electrical-to-optical conversion efficiency is very important for many of those applications. Typical Yb-doped fiber lasers at 976–980 nm have a reduced cladding area to shorten the pump absorption length to less than a meter. However, reduction of a cladding diameter automatically results in a less coupled pump power from laser diodes. In the other approach, the core diameter can be increased along with a proportionally reduced a numerical aperture of the fiber. The maximum core diameter is limited by the requirement of single-mode propagation in the core and enhanced bending loss in low numerical aperture fibers. The latter approach along with a requirement to maintain a high pump power density along the fiber may provide an efficient way for high power generation in Yb fibers. The same considerations are valid for three-level transitions in fibers doped with Nd, Er, Tm and other ions. Clearly there is a need to find a more efficient method to generate a high optical power in rare-earth ion-doped fiber lasers at three-level and quasi-three-level transitions.

SUMMARY OF THE INVENTION

In one aspect, an apparatus in accordance with the present invention comprises an amplifier fiber having a doped core surrounded by a cladding. The core doping provides optical gain for light propagating therein when the doped core is energized by pump light absorbed in the core. An optical pumping arrangement for the amplifier fiber includes one or more transmission fibers. The optical arrangement is configured to insert pump-light from a source thereof into the amplifier fiber cladding such that the pump light propagates in the cladding. The optical arrangement is further configured to receive an unabsorbed portion of the propagated pump light from the cladding, and re-insert the unabsorbed portion of the pump-light into the cladding for re-propagation therein.

The inventive apparatus is particularly useful for pumping lengths of amplifier fiber that are too short to allow all of the pump light propagating in the cladding to be absorbed in the amplifier fiber core in a single pass through the fiber. Extracting and re-inserting unabsorbed pump light makes use of pump light that would otherwise be wasted.

In one preferred embodiment, the optical pumping arrangement includes a plurality of N+M, transmission fibers. Ends of all of the N+M transmission fibers are formed into a first composite fiber or multiplexer having a diameter about equal to the diameter of the amplifying fiber. The first composite fiber is coupled to an input end of the amplifying fiber. Opposite ends of N of the transmission fibers are formed into a second composite fiber also having a diameter about equal to the diameter of the amplifying fiber. The second composite fiber is coupled to an input end of the amplifying fiber. Pump light is inserted from the pump light source into the amplifier cladding via one or more of the M fibers, and is received from the amplifier cladding and reinserted into the amplifier cladding via one or more of the N fibers.

This embodiment is particularly useful for optically pumping an amplifier with light from a plurality of diode-laser emitters. By way of example, light from each of M emitters can be directed into a corresponding one of the M fibers. Other aspects and embodiments of the present invention will be evident to those skilled in the art for the detailed description of the invention presented hereinbelow.

BRIEF DESCRIPTION OF THE DRAWINGS

FIGS. 10b–10e schematically illustrate alternative embodiments of the optical fiber isolator of FIG. 10a.

DETAILED DESCRIPTION OF THE PREFERRED EMBODIMENTS

Figure 1A:
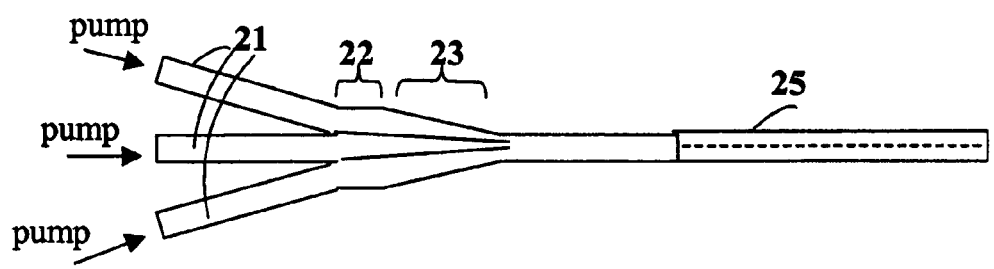
FIG. 1a schematically illustrates a prior-art pumping arrangement for a fiber laser including a plurality of optical fibers delivering pump light, the plurality of being bundled, tapered, and fused into a single multimode fiber spliced onto an end of the fiber laser to deliver pump light longitudinally into the fiber laser.
Figure 1B:
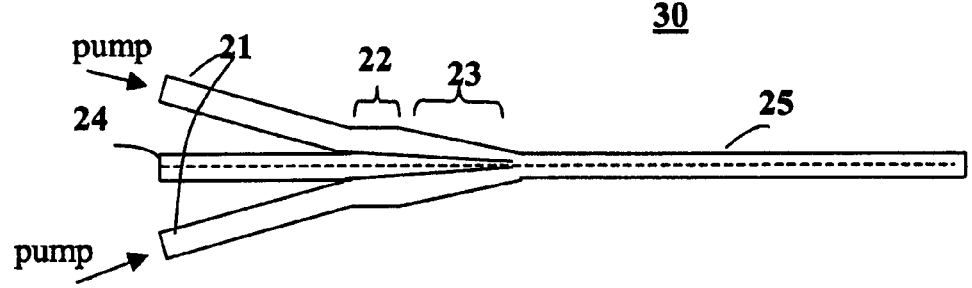
FIG. 1b schematically illustrates a prior-art pumping arrangement for a fiber amplifier including a plurality of optical fibers delivering pump light, each of the fibers being fused together with the cladding of the fiber amplifier to deliver pump light longitudinally into the cladding of the fiber amplifier.

FIGS. 1a–1b illustrate the prior art arrangement based on a tapered fiber bundles for coupling light into cladding-pumped fibers. FIG. 1a illustrates an arrangement (20) comprising a plurality of individual multimode fibers (21), which converge to a bundled region (22), which extends to a tapered region (23). The bundle tapers to a minimum diameter closely approximating the diameter of the cladding-pumped fiber (25). Finally, the tapered bundle is spliced to a cladding-pump fiber. Alternatively, the tapered bundle can be first spliced to an intermediate multimode fiber, which in its turn is spliced to a cladding-pumped fiber. Any of these arrangements can be referred to as bundling the plurality of optical fibers into a single composite fiber. It is contemplated that each individual multimode fiber (21) (of which only three are shown in FIG. 1a) will couple light from an associated semiconductor emitter source. FIG. 1b shows an alternative arrangement (30) where one of the bundled tapered fibers is a single-mode fiber (24). The core of the single-mode fiber (dashed line) can be used to efficiently couple light through the taper into or out of the core of the cladding-pumped fiber while the multimode fibers (21) are used to couple light into the cladding of the cladding-pumped fiber. Such couplers are usually called M-plexers, or combiners, or tapered bundles.

Figure 2A:
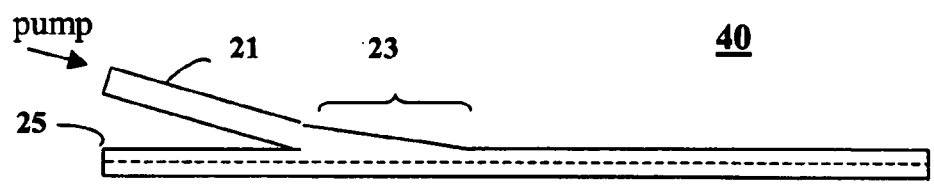
FIGS. 2a–2b schematically illustrates a lateral coupling arrangement for pumping a fiber amplifier or a fiber laser wherein at least one optical fiber delivering pump light is fused into the cladding of the fiber to form a fused region tapering to the diameter of the fiber amplifier or fiber laser.
Figure 2B:
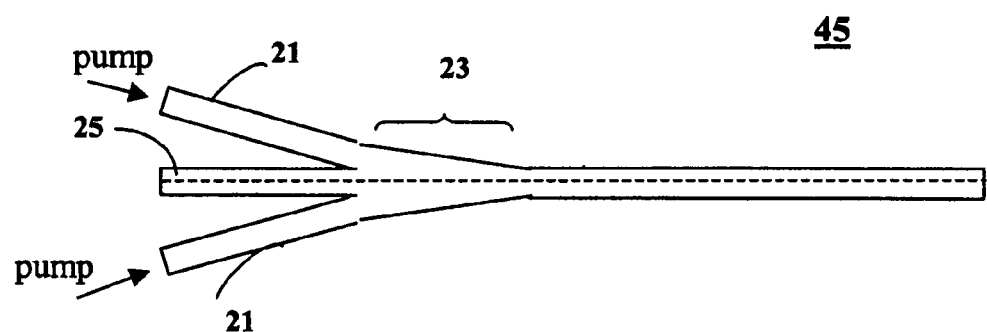

FIGS. 2a–b show alternative arrangements called side coupling. In FIG. 2a, a feeding multimode fiber (21) is tapered (23), i.e. Heated and pulled, in order to reduce its diameter and then a coupler (40) is formed for example, by twisting and fusing such a tapered portion of the fiber (21) on the cladding-pumped fiber with preliminary removed polymer cladding. FIG. 2b shows a side coupling (45) with a few multimode fibers (21).

Side coupling can be also provided through an optical contact between a feeding multimode fiber (21) and a cladding-pumped fiber (25). A fiber called GTwave™ (Southampton Photonics (SPI) of England) has been developed providing an optical contact between feeding fibers and a cladding-pumped fiber during a fiber drawing process. Such a contact along longitudinally extended fiber surfaces permits a distributed coupling of the pump light.

Figure 3A:
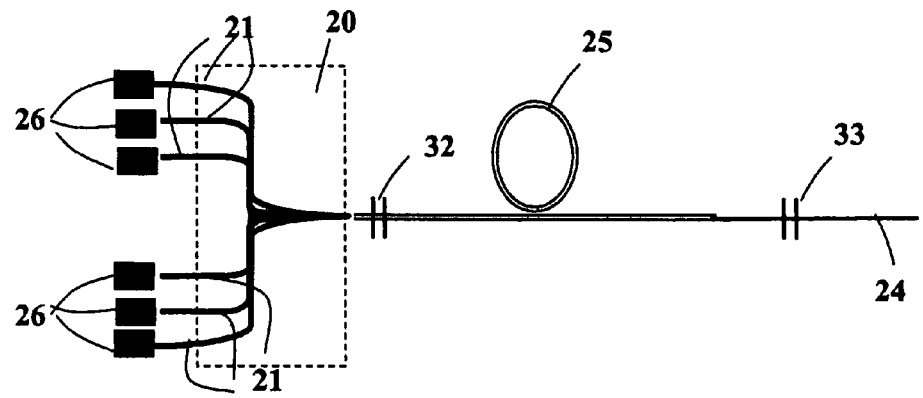
FIG. 3a schematically illustrates a fiber laser including a plurality of pump light sources delivering light to a corresponding plurality of optical fibers in the arrangement of FIGS. 1a–1b.

FIG. 3a shows a prior art fiber laser embodiment comprising pigtailed semiconductor emitter sources (26) spliced to M-plexer (20), a fiber Bragg grating (32) written in piece of single-mode fiber recoated with low-index polymer and spliced with an output fiber of M-plexer from one side and with a cladding-pumped fiber (25) from the other side, and a fiber Bragg grating (33) written in a single-mode fiber (24) as an output coupler. The length of the fiber (25) is chosen to absorb, practically, all pump light (10 dB absorption). For example, a typical fiber length for Yb-doped fiber lasers varies from 7–10 m pumping at 976 nm to 20–30 m pumping at 915 nm. Although fluorescence spectrum extends from 1020 nm to 1150 nm most of such lasers generate in the region 1060–1100 nm. Generation at short wavelengths is inefficient because of strong re-absorption of the laser light in a long fiber cavity.

Figure 3B:
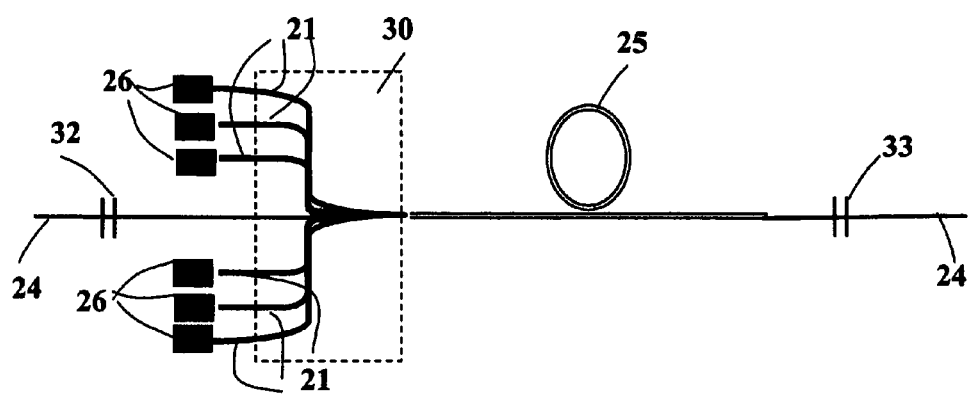
FIG. 3b schematically illustrates a fiber laser including a plurality of pump light sources delivering light to a corresponding plurality of optical fibers in the arrangement of FIGS. 2a–2b.

FIG. 3b shows a prior art embodiment of the fiber laser. This embodiment comprises M-plexer (30) with a single-mode fiber in the center of the bundle. Such a scheme allow the high reflector (32) to be positioned outside of the active cavity providing better reliability for the fiber Bragg grating.

Figure 4:
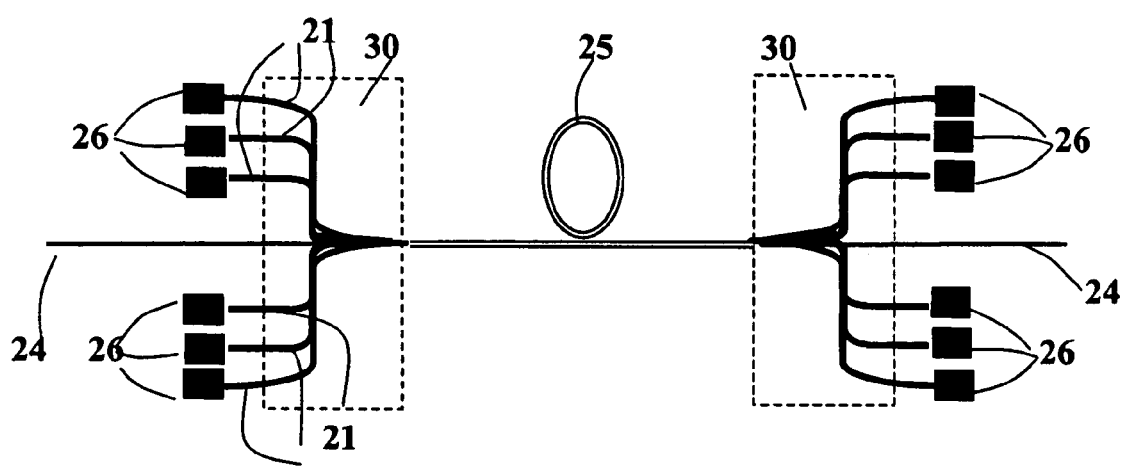
FIG. 4 schematically illustrates a fiber laser similar to the laser of FIG. 3a but wherein there are two pluralities of pump light sources delivering light to a corresponding two pluralities of corresponding multimode fibers, with one plurality of multimode fibers delivering pump light to one end of the fiber laser, and the other plurality of multimode fibers delivering pump light to an opposite end of the fiber laser.

FIG. 4 shows a prior art fiber amplifier embodiment comprising pigtailed pump sources (26), two M-plexers (30) for pumping a fiber (25) from ends, a cladding-pumped fiber (25), and single-mode input and output fibers (24).

FIGS. 5–8 illustrate preferred arrangements of the invention. FIGS. 5a,b illustrate the operation of a side de-coupler (50). A cladding pumped fiber (25), which may be designated an amplifier fiber, bearing a residual pump light is tapered in order to reduce its diameter (FIG. 5a). A de-coupling multimode fiber (21), which may be referred to as a transmission fiber, is tapered (FIG. 5a) and then fused to the tapered region of the fiber (25) to form a de-coupler (FIG. 5b). It is preferable to have a diameter of the fiber (21) in the fused region larger than that of the tapered region of the fiber (25) because the amount of the residual pump power de-coupled from the fiber (25) to the fiber (21) is approximately proportional to the ratio between squares of the areas of the fiber (21) and the fiber (25). Alternatively, fibers (21) and (25) can be twisted before fusing. Alternatively, the tapered fibers (21) and (25) can be in optical contact with their surfaces with no fusion. Alternatively, the fibers (21) and (25) can be fused or can provide an optical contact in part of their length with no tapering. Alternatively, instead of the fiber (25) with a core doped by rare-earth ions a single-mode fiber with a non-doped core (24) can be used. In this case, the fiber (24) should be preliminary spliced to the cladding-pumped fiber (25).

Figure 5A:
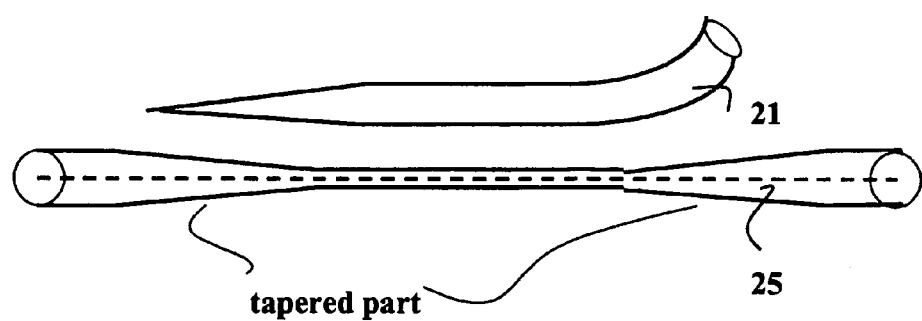
FIGS. 5a–5b schematically illustrate one preferred arrangement in accordance with the present invention for coupling pump-light out of the cladding of a fiber laser or fiber amplifier into one or more optical fibers.
Figure 5B:
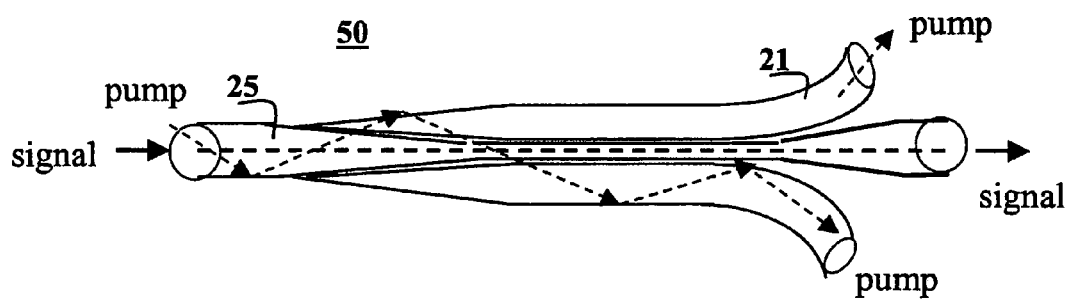

FIG. 5b shows de-coupling process. A signal light propagates in the core of the fiber (25) and a pump light propagates in a cladding of the same fiber. After the de-coupler the signal light propagates in a single-mode fiber (25) while the pump light propagate in multimode fibers (21). Small quantities of the residual pump light proportional to the ratio between the area of the single-mode fiber (25) and the total area of all multimode fibers (21) propagate in the fiber (25). Fibers (21) and (25) being in optical contact or fused can be recoated. The number of output ports of the de-coupler can be arbitrary. Advantageously, it should correspond to the number of free input ports in a ring cavity.

Figure 5C:
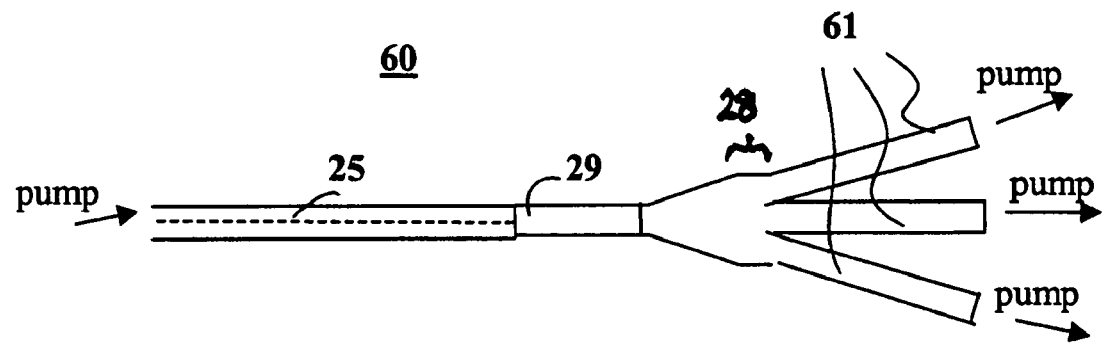
FIGS. 5c–5d schematically illustrate preferred arrangements in accordance with the present invention for coupling pump-light out of the cladding of a fiber laser or fiber amplifier into a fused bundle of optical fibers.
Figure 5D:
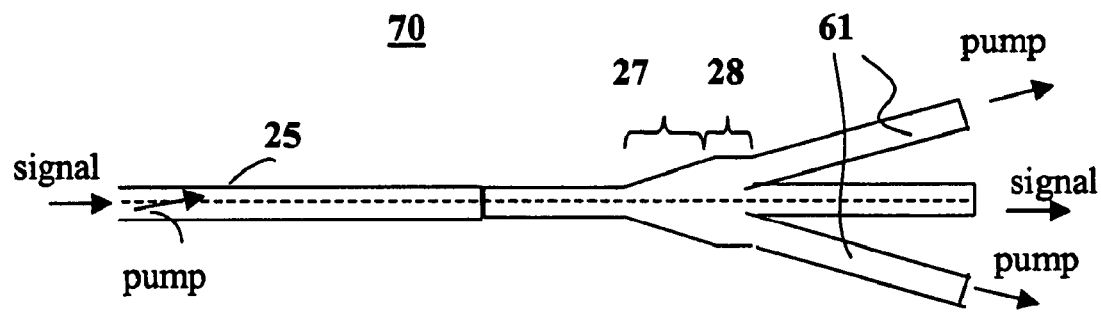

FIG. 5c illustrates an arrangement (60) of a de-coupler based on a fused bundle comprising a plurality of individual multimode fibers (61), which converge to a bundled region (28), which extends to a tapered region (27). The bundle tapers to a minimum diameter closely approximating the diameter of an intermediate multimode fiber (29) and is spliced to that fiber (29). Alternatively, the tapered bundle can be spliced directly to the cladding-pumped fiber (25) or to a cladding-pumped fiber with a passive single-mode core (no doping with active ions generating light). FIG. 5d shows an alternative arrangement (70) where one of the bundled tapered fibers from the arrangement (60) is a single-mode fiber (24). The core of the single-mode fiber (dashed line) can be used to transmit signal light through the taper out of the core of the cladding-pumped fiber (25) while the multimode fibers (61) are used to de-couple light from the cladding of the cladding-pumped fiber.

De-coupler based on tapered fiber bundle can be made as follows. A few multimode fibers with removed coating in the region where they will be bundled are bundled together into a close-packed formation. The central fiber within the bundle may be a fiber with a single-mode core. It is preferable to have this single-mode fiber pre-tapered or with a smaller cladding diameter compared to those of multimode fibers. The fibers are twisted under controlled tension. The bundle is then heated and pulled to provide adiabatical tapering to the final diameter of the cladding-pumped fiber.

The number of fibers, core diameters and numerical apertures depend on the cladding-pumped fiber parameters. There is a condition on fiber parameters for reducing losses in the de-coupler. In general, losses are minimized by maintaining the condition $$S_{input}(NA_{input})^2 \leq \sum S_{i,output}(NA_{output})^2$$

where $NA_{input}$, $NA_{output}$ are the numerical apertures of the cladding-pumped fiber and the output multimode fibers, respectively, $S_{input}$ is the area of the cladding-pumped fiber (or the minimum taper diameter), $\Sigma S_{i,output}$ is the summation of the cross areas of the fibers. This requirement is opposite to that applied to the prior art M-plexer (20). However, in practice, the pump light may not fill the whole numerical aperture of the cladding-pumped fiber. In this case, a de-coupler with the output fiber parameters not satisfying the above derived inequality may still provide low loss de-coupling of the residual pump power.

Typical multimode fibers shown in FIG. 5–7 have a silica core that is surrounded by a fluorinated cladding providing a numerical aperture from 0.12 to 0.22. Typical core diameters are 100–110 microns with outer cladding diameter of 125 microns. Fibers with 200/220 core/cladding diameters are also common. Multimode fibers with a silica core and a polymer cladding, holey (air-silica) multimode fibers can be also used.

Figure 6A:
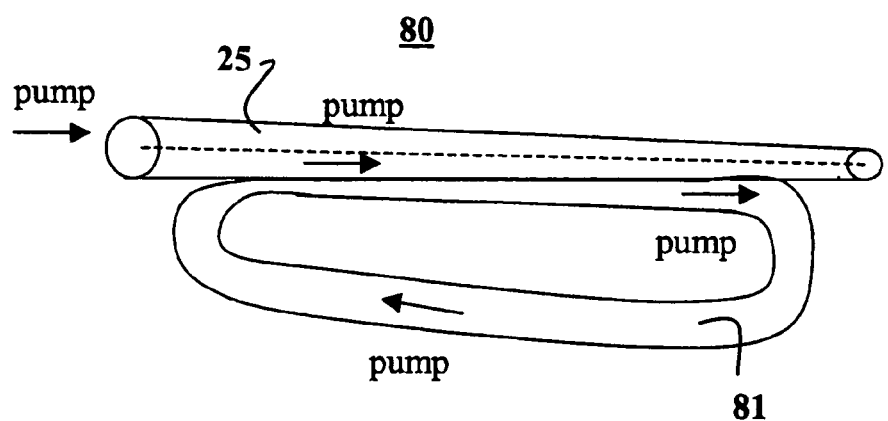
FIGS. 6a–6c schematically illustrate preferred arrangements in accordance with the present invention wherein a single fiber is used for coupling pump-light out of the cladding of a fiber laser or fiber amplifier and re-coupling the out-coupled pump light back into the cladding of the fiber laser or fiber amplifier.
Figure 6B:
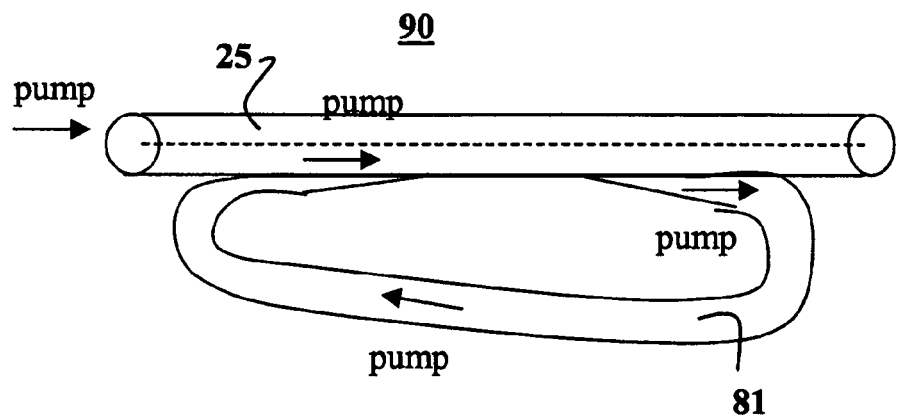

FIG. 6a shows a fiber arrangement (80) comprising a cladding-pumped fiber (25) with gradually reducing diameter along the length of the fiber, and a multimode fiber (81) with gradually increasing diameter along the length of the fiber. Fibers may be fused together or be in optical contact. A multimode fiber (81) is preferably a silica fiber with a polymer cladding or an all-silica fiber. Such a scheme with gradually changing parameters of the fibers provides an efficient de-coupling of the pump power at the end of the fiber (25) because the diameter of the fiber (81) at this end is larger than that of the fiber (25). In contrast, the diameter of the input end of the fiber (81) is less than that of the fiber (25) providing efficient coupling of the residual pump back to the cladding-pumped fiber (25). It is well known that reduction in the fiber core diameter increases the divergence angle of a beam propagating along the fiber. As long as such an angle remains smaller than the numerical aperture (NA) of the fiber, no excessive loss appears. As a result, coupling between such a tapered fiber and an un-tapered one can be very efficient. The arrangement (80) provides also a ring cavity for the residual pump increasing a pump power density in the fiber (25). The arrangement (80) is not limited by fibers with gradually changing diameters. The cladding-pumped fiber (25) may have a constant diameter along its length, as shown in FIG. 6b. Additionally, the fiber (81) may not form a continuous ring and may be of a constant diameter. The ends of the fiber (81) can be tapered and fused to the cladding-pumped fiber (25) as shown in FIG. 6b. The taper from the pump input side can be done to provide efficient coupling of the residual pump power back to the fiber (25) using side coupling technique. The taper from the pump output side can be done using arrangement (50) for a side de-coupler. FIG. 6b shows one of such arrangements (90).

Figure 6C:
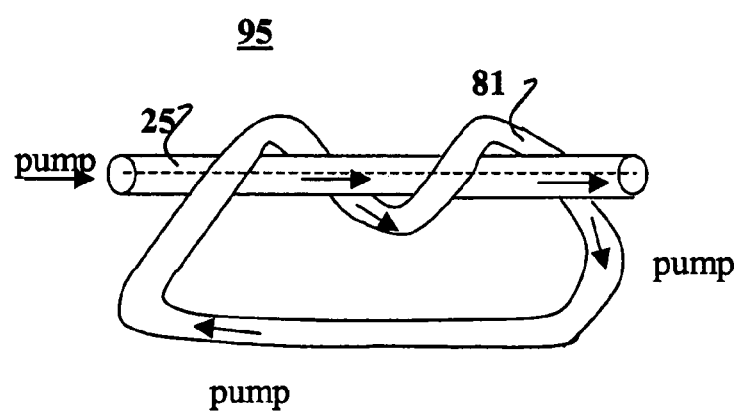

FIG. 6c illustrates a fiber arrangement (95) comprising a twisted cladding-pumped fiber (25), and a multimode fiber (81) with constant diameters along the fibers. Fibers may be fused together or be in optical contact. This arrangement is less efficient than that (80) and (90) in the sense of coupling back the residual pump power to the fiber (25); however, it is easier to fabricate. For example, the output ends of a GTwave™ fiber can be spliced back to open input ports providing a ring cavity for the residual pump. Additionally, more loops formed by fibers (81) can be attached to the cladding-pumped fiber (25) or to the other fibers (81) in arrangements (80), (90), (95).

Arrangements (80), (90), (95) are the simplest forms of a ring cavity for the pump light based on a side de-coupling by fusion or by optical contact through the side surfaces of fibers. The alternative way to form ring cavities for the pump light is to use de-couplers based on tapered fiber bundles (60), (70).

Figure 7A:
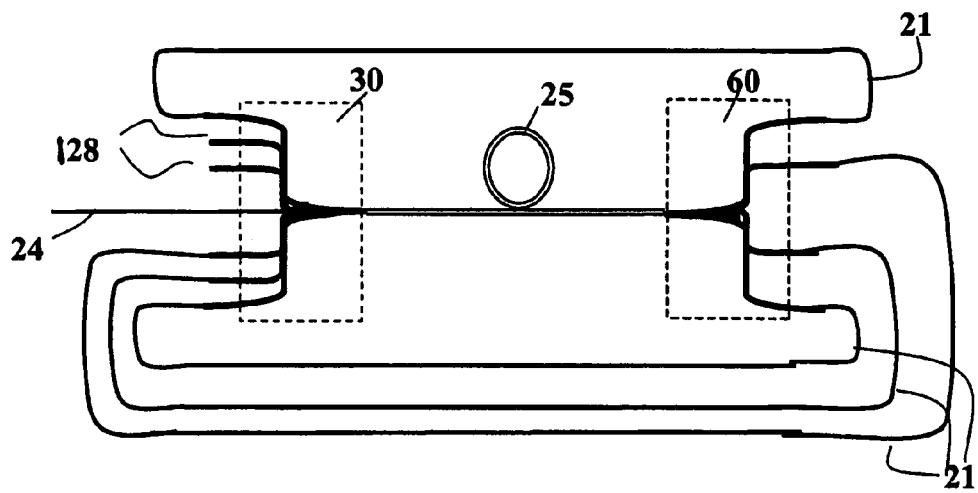
FIGS. 7a–7e schematically illustrate a fiber amplifier and fiber lasers in accordance with the present invention wherein there are six pump-light input fibers two of which are supplied by pump light sources and the remaining four of which are supplied with pump light by four fibers arranged to couple the pump light out of the fiber laser or amplifier in accordance with the present invention.

FIG. 7a shows an arrangement (100) comprising an M-plexer (30), a de-coupler (60), a cladding-pumped fiber (25), a single-mode output fiber (24), and connecting multimode fibers (21). The number of the input ports of the M-plexer (30) is larger than the number of the output ports of the de-coupler (60). The output ports of the de-coupler (60) are spliced with the input ports of the M-plexer providing a ring cavity for the residual pump. The two open input ports (128) of the M-plexer can be used for pumping the cladding-pumped fiber (25). Note, the number of spliced and non-spliced fibers in the M-plexer is not critical and can vary depending on available pump power sources and parameters of the cladding-pumped fiber, M-plexer, and de-coupler. The fibers providing the pump light from the input ports 128 to the amplifier may be referred to as pump fibers while the fibers 21 which receive the unabsorbed portion of the pump light and return it to the fiber may be referred to as recovery fibers.

The advantage of the ring cavity can be understood from the following consideration. A pump power, P is launched through the input ports into the cladding-pumped fiber doped with ions having a three-level transition scheme. To avoid re-absorption in an amplifying fiber the length of this fiber should be short, resulting in non-efficient pump absorption. For the absorption of $\alpha=0.3$, the residual pump power will be 70% of the initial one. Assuming that the de-coupler does not introduces any loss, the ring cavity will permit re-circulation of the residual pump power thereby increasing the pump power inside the cavity by a factor of approximately $(1-\alpha)^{-1}$. An increase of the intracavity pump power favors to generation in three level systems. For example, generation at 976 nm in a cladding-pumped Yb-doped fiber pumped by multimode laser diodes at 915 nm with the cladding-pumped fiber diameter of 125 micron and NA of 0.45 requires a short cavity length with the pump absorption of 1–3 dB. The presented ring cavity for the pump light will provide an efficient use of all pump power.

Figure 7B:
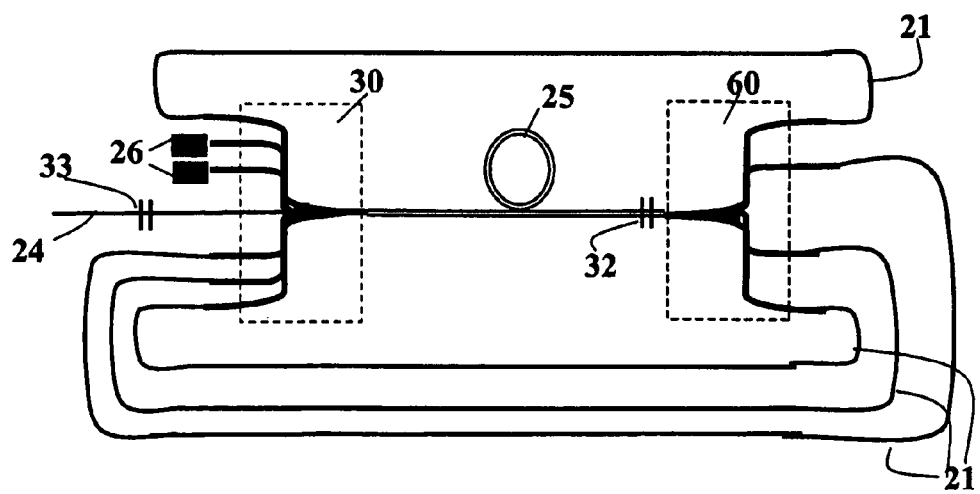
Figure 7C:
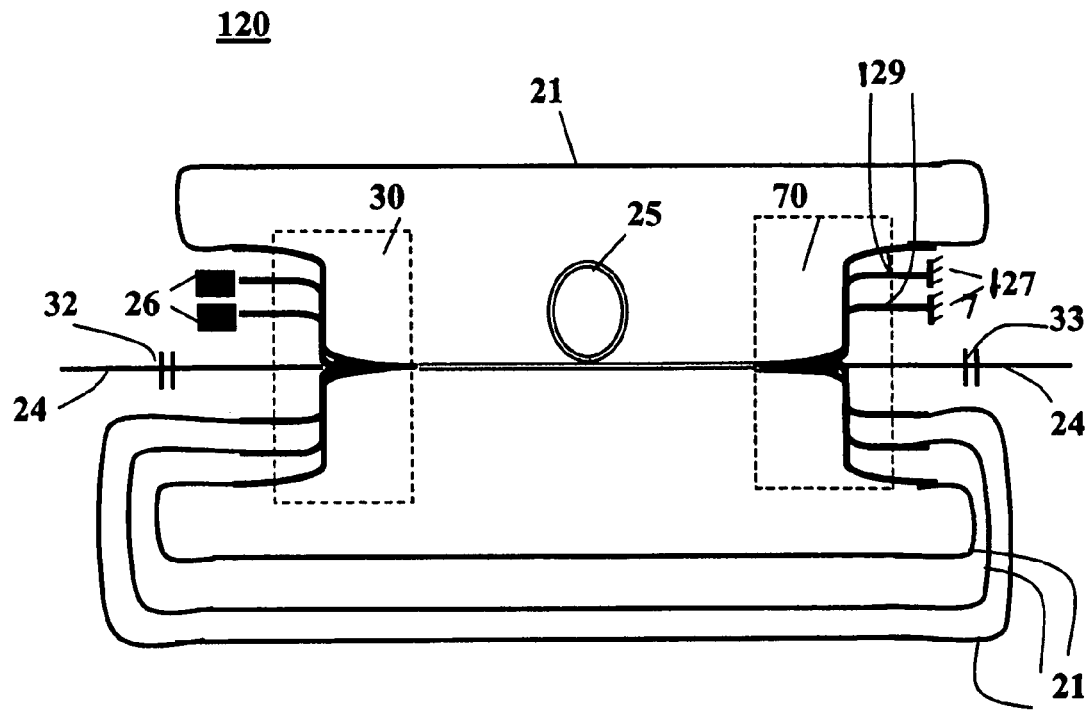

FIG. 7b shows a fiber laser arrangement (110) comprising a ring cavity (100), pump sources (26), and two fiber Bragg gratings (32), and (33). The fiber Bragg grating (33) can be also spliced directly to the fiber (25). All fiber Bragg gratings can be also replaced by dielectric mirrors.

Figure 7D:
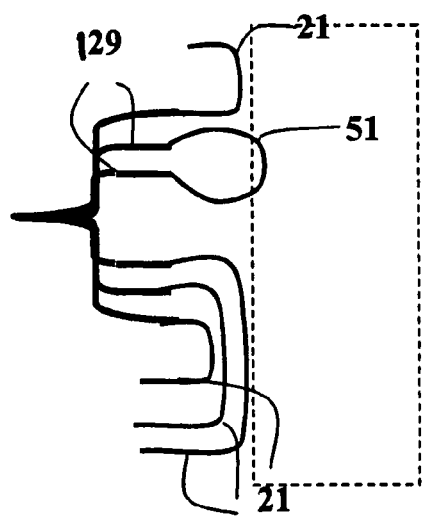

The de-coupler may have different configurations. If the pumping light completely fills the numerical aperture of the cladding pumped fiber, it is preferable (although not critical) to have the same number of pump output ports in the de-coupler as the number of pump input ports in the coupler (20), (30), (40). The number of open input ports in the coupler may be less than that in de-coupler due to the number of input ports occupied by pump sources. In this case, the excess number of output ports can be used to send a residual pump back to the cavity as in a linear cavity case. As an example, in FIG. 7c there are two mirrors (127) at the output of the fibers (129) to send a part of the residual pump back to the cavity. Instead of using mirrors, two output fibers (129) or more can be spliced to each other providing a loop (51) for the pump as is shown in FIG. 7d. The fibers in the M-plexer and de-coupler forming a ring cavity for the pump preferably should have similar geometrical parameters to provide low loss splicing, although a small difference in numerical apertures and geometrical sizes is not critical. In this configuration, only a small part of a residual pump power is reflected back. This power is proportional to the ratio between ports occupied by pump sources (26) and open ports in the input M-plexer (30). Most of the residual pump power circulates through the spliced output and input fibers (21).

If a reflected back pump power is strong enough to damage the pump laser, it is preferable to use a de-coupler with the number of ports equal or less than a number of open ports in the M-plexer, as shown in FIG. 7b.

In some cases, a pump source (26) does not fill the entire numerical aperture of an input fiber (21) in M-plexers and couplers (20), (30), (40), or most of the energy is concentrated in an angle range less than a numerical aperture of the fiber (21). For example, the fiber (21) may have a typical numerical aperture of 0.22, however, 90% of the pump source (26) energy is concentrated in a cone corresponding to the numerical aperture of 0.15. In this case, the number of output ports in the de-coupler may be less than the number of the input ports of the M-plexers and side-couplers. Such a de-coupler may still provide a low-loss de-coupling of the pump power.

Figure 7E:
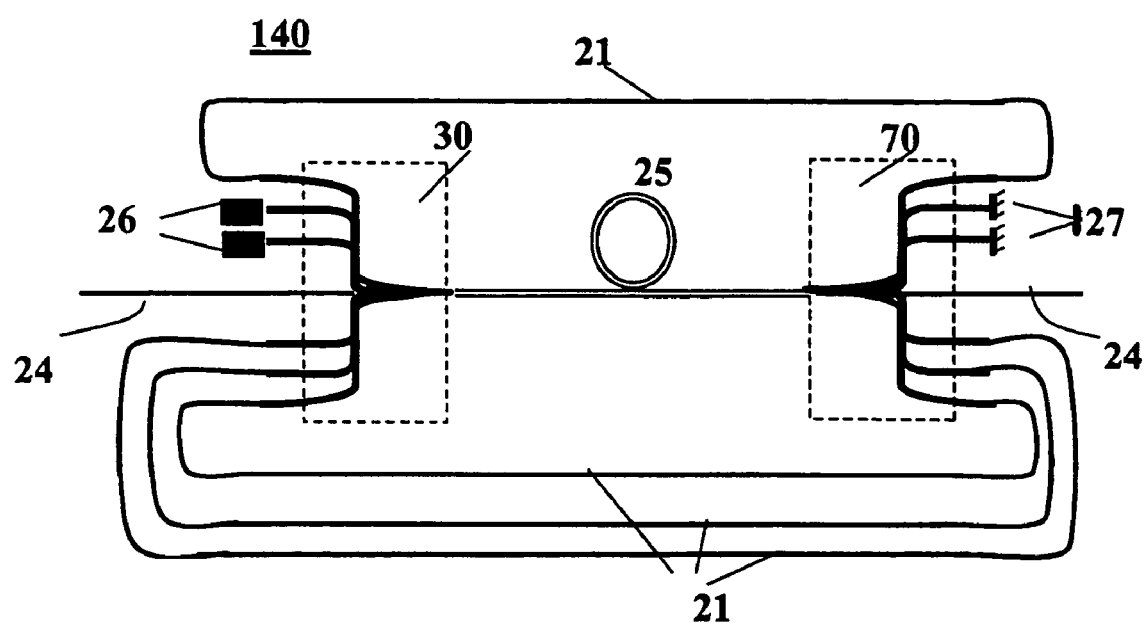

FIG. 7e shows an optical amplifier (140) arrangement comprising a ring pump cavity arrangement with the pump power partially reflected back by mirrors (27), and pump sources (26).

Figure 8:
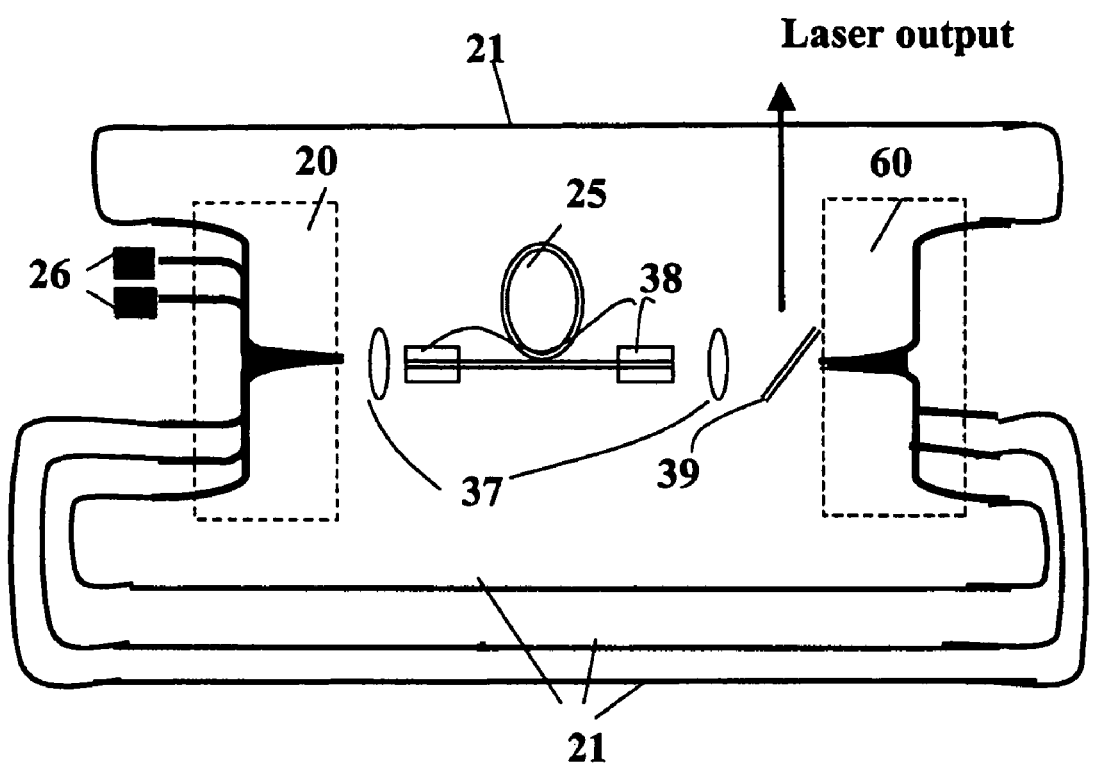
FIG. 8 schematically illustrates a fiber laser in accordance with the present invention similar to the arrangements of FIGS. 7a–e but wherein a lenses are used to couple pump light from the input fibers into the fiber laser and to deliver pump light from the laser to the out-coupling fibers.

A ring cavity for the residual pump light can be also used with bulk optics. FIG. 8 shows a fiber laser arrangement comprising a ring pump cavity arrangement with lenses (37), bulk mirrors (38) butted to a cladding-pumped fiber (25), pump sources (26), a dichroic mirror (39) that is transparent for a pump light and is reflective for a laser light, M-plexer (20), connecting fibers (21), and de-coupler (60). Similar arrangements can be provided for crystal lasers and waveguide lasers.

Fiber lasers based on ring cavity arrangements for a residual pump can be efficient sources of powerful radiation in three-level systems. In turn, radiation from these lasers can be used to pump the other lasers. For example, light from a Nd-doped fiber laser at 910–940 nm, as well as light from an Yb-doped fiber laser at 976 nm and at 1020–1040 nm can be used to pump the next Yb-doped fiber laser or amplifier to get generation at 1020–1150 nm. The output light from each of the pump fiber lasers has a good beam quality, low NA, and a small cross-section, corresponding to a single-mode or a few modes, or a large mode area fiber. Because brightness of these pump fibers is much higher than that of multimode laser diodes or laser bars the second cascade fiber laser or amplifier may have a reduced cladding diameter and/or reduced numerical aperture compared to those of the pumping fiber lasers. By this arrangement, an all-silica (or in general an all-glass) cladding structure can be constructed for the second fiber laser cascade. It is important for high power fiber lasers to have a cladding not from a low-index polymer, but from silica. A silica cladding can withstand a higher pump power level compared to a polymer cladding.

Figure 9:
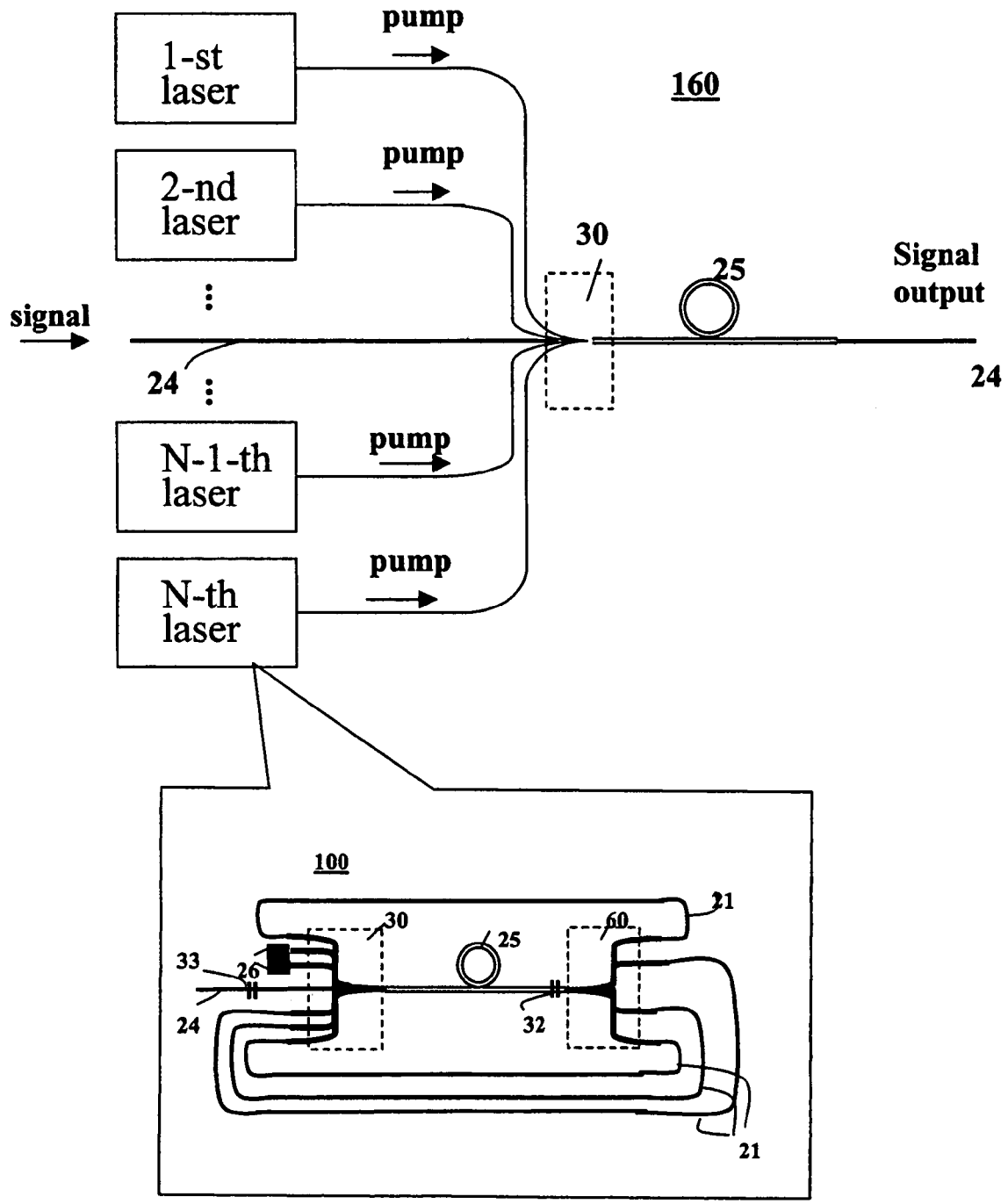
FIG. 9 schematically illustrates a fiber amplifier optically pumped by a plurality of fiber lasers in accordance with the present invention.

FIG. 9 shows a high power fiber amplifier arrangement comprising many individual pump fiber lasers, M-plexer (30), a cladding-pumped fiber (25), and single-mode input and output fibers (24). Pump fiber lasers may use a ring pump cavity design, for example, arrangement (100)—as shown in FIG. 7b. The pump light from N individual fiber lasers is combined in a tapered bundle (30) and enters into the cladding of the fiber (25). A signal light enters through a single-mode fiber (24) into the cladding-pumped fiber (25), is amplified, and goes out through the other single-mode fiber (24).

An inventive arrangement of an all-fiber high power master oscillator—power amplifier scheme with no bulk isolators is next described. In one aspect, the arrangement comprises a fiber laser operating in CW, or Q-switched, or mode-locked regime and generating a signal at a wavelength shorter than that will be amplified, a fiber isolator arrangement, and a fiber amplifier providing amplification of the Stokes signal. The inventive arrangement uses stimulated Raman scattering to shift the frequency of a signal (pump signal) from a master oscillator (or a first amplifier) to longer wavelengths in the Stokes region (Stokes signal) along with one or more spectrally selective fiber optic elements (fiber isolators) suppressing penetration of the Stokes signal back to the master oscillator, and suppressing penetration of the pump signal in the power amplifier. The arrangement comprises a length of a fiber to generate the Stokes signal. A fiber isolators may include one or more of a wavelength-division multiplexer (WDM), a slanted, blazed, or long-period fiber gratings, single-mode fiber to multimode fiber couplers, and a piece of a fiber doped with ions absorbing either the pump signal or the Stokes signal.

Figure 10A:
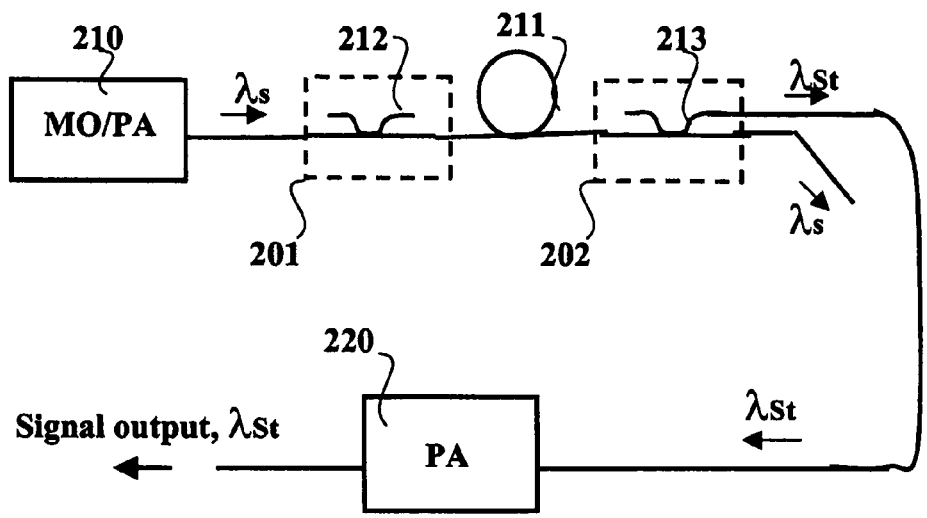
FIG. 10a schematically illustrates inventive apparatus for delivering light from a source via an arrangement of optical fibers to an optical amplifier, the optical fiber arrangement including a length of fiber sufficient to convert the source light to light having a Stokes shifted wavelength before it is delivered to the optical amplifier, and including a fiber optical isolator between the source and the Stokes shifting fiber to attenuate any Stokes shifted light reflected from the optical amplifier back along the fiber arrangement into the source.

FIG. 10a shows an embodiment of the inventive arrangement including a fiber master oscillator (210)—power amplifier (220) system with all-fiber isolator arrangement. Traditionally, a bulk isolator is placed between a master oscillator and a power amplifier to prevent interaction between them. Fiber amplifiers usually exhibit strong gain (>20 dB), thus a strong isolation is required to prevent any reflection back to a power amplifier. Strong amplified spontaneous emission from a power amplifier may also disturb generation in a master oscillator. For a multi-cascade amplifier the isolation requirements between cascades are even stricter. The risk of optical damage limits using bulk optics in the case of single-mode fibers amplifiers. There is a strong need in an all-fiber isolator which would prevent a feedback between a master oscillator and a power amplifier or between two amplifiers.

The isolator operates as follows. Light at wavelength $\lambda s$ comes out of the master oscillator (210). In general, an arbitrary fiber amplifier cascade can be considered instead of the master oscillator (210) in FIG. 10a. It is preferable that $\lambda s$ is not in the band of amplification of the power amplifier (220) or is in a short wavelength side of that band. A spectrally selective element (201) including a WDM (212) transmits light at wavelength $\lambda s$, and switches light corresponding to the first Stokes shift $\lambda_{St}$ from one arm to another one. In a piece of a fiber (211) the signal light generates a Stokes signal at wavelength $\lambda_{St}$ by stimulated Raman scattering. The fiber length is chosen to provide an efficient conversion of the input light to the Stokes component. The next element (202) is a WDM (213) to separate a Stokes signal at $\lambda_{St}$ and a residual input signal at $\lambda s$ by switching the Stokes signal in the other arm of a WDM (213). This element prevents penetration of a residual input signal into a power amplifier (220). This Stokes signal is amplified in a power amplifier (220). The Stokes signal wavelength is chosen preferably (but not necessarily) in the maximum gain region.

Figure 10B:
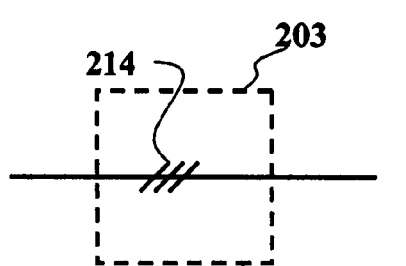
Figure 10C:
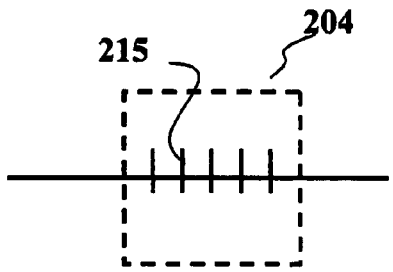
Figure 10D:
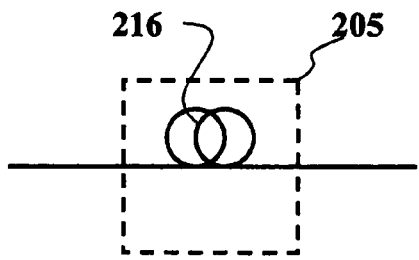

An amplified spontaneous emission (ASE) from a power amplifier (220) propagates back towards a master oscillator (210) through blocks (202), (201), and a fiber (211). To prevent a feedback between a master oscillator (210) and an amplifier (220) ASE should be efficiently suppressed. To provide a sufficient extinction for ASE a few WDMs (201) can be used with similar or slightly shifted central wavelengths. As an alternative to a WDM, an element (203) including slanted or blazed fiber Bragg gratings (214) can be used. Such a blazed fiber Bragg grating will de-couple ASE from the fiber core to a cladding in backward direction (FIG. 10b). An alternative solution for element (201) is an element (204) with a long-period fiber grating (215) that de-couples ASE from a fiber core to a cladding in forward direction (FIG. 10c). FIG. 10d shows another alternative solution (205) for an element (201) comprising a piece of a fiber (216) doped with ions absorbing ASE. For example, Sm-doped fibers exhibit strong absorption at 1060–1090 nm and, practically, are transparent at 975–1050 nm. Thus, a master oscillator can be chosen to generate light at 1020–1050 nm while a Stokes shifted signal and ASE corresponding to maximum amplification at 1070–1090 nm in Yb-doped fiber amplifier exhibit strong absorption in Sm-doped fiber. Spectrally selective elements (201)–(205) can be also chosen to provide transmission for a Stokes signal and to provide extinction for an input signal. In this case, these elements should be preferably placed after WDM (202).

Figure 10E:
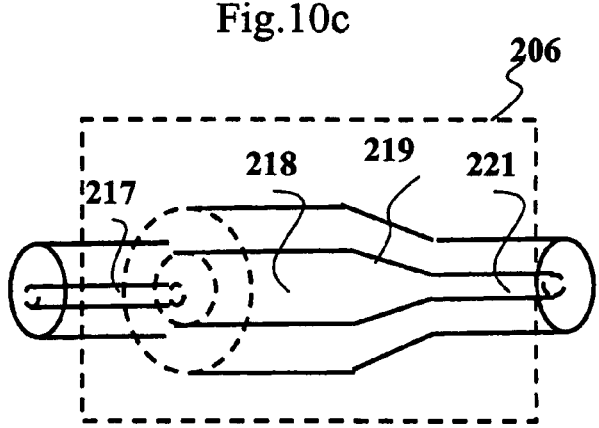

Another alternative solution is an element (206) presented in FIG. 10e comprising a splice between a fiber with a small core area (217) and a fiber with much larger core area (218). Light propagating from a small core area fiber towards a large core area fiber will exhibit less attenuation than counter-propagating light. A short piece of a large core area fiber (218) will not disturb a mode distribution of a small core area fiber (217). An adiabatic taper (219) will couple light back to a small core area fiber (221) with low loss (<1 dB). Counter-propagating light from a fiber (221) to a fiber (217) will exhibit strong loss at the splice between a fiber (217) and a fiber (218). This loss is approximately proportional to the ratio between core areas of two fibers. For example, difference in core diameters of 3.1 times results in attenuation of 10 dB for a counter-propagating signal. Element (206), practically, is not spectrally selective and can be used with or even without elements (201)–(205) and a fiber (211). A few elements (206) can provide a good isolation from ASE. Elements (201)–(206) can be used in a series in any combination with each other.

Although the above-derived embodiments consider optical fiber arrangements, the invention can be applied to any waveguide lasers and amplifiers and is not limited by fiber arrangements only.

While the above invention has been described with particularity to specific embodiments and examples thereof, it is understood that the invention comprises the general novel concepts disclosed by the disclosure provided herein, as well as those specific embodiments and examples, and should not be considered as limited by the specific embodiments and examples disclosed and described herein.

What is claimed is:

1. Optical apparatus, comprising:
   an amplifier fiber having a doped core surrounded by a cladding, said core doping providing optical gain for light propagating therein in a propagation direction when said doped core is energized by pump light absorbed therein; and
   an optical arrangement configured to insert pump-light from a source thereof into said cladding of said amplifier fiber such that said pump light propagates in said cladding thereof in said propagation direction; and
   at least one recovery fiber configured to receive an unabsorbed portion of said propagated pump light from said cladding and for re-inserting said unabsorbed portion of said pump-light into said cladding for re-propagation therein.

2. The apparatus of claim 1, wherein said amplifier fiber includes first and second fiber Bragg gratings therein forming a laser resonator.

3. The apparatus of claim 1, wherein said recovery fiber is in the form of a continuous loop and a portion thereof is twisted around said amplifier fiber.

4. The apparatus of claim 1, wherein said recovery fiber is arranged to couple pump light out of said amplifier cladding at a first location thereon and re-couple said pump light into said amplifier cladding at a second location thereon, said first location being downstream of said second location in said propagation direction.

5. The apparatus of claim 4, wherein said recovery fiber is fused together with said amplifier fiber cladding at said first and second locations.

6. The apparatus of claim 1, wherein said optical arrangement includes at least one pump fiber.

7. The apparatus of claim 5, including M pump fibers and N recovery fibers each of which having first and second ends, wherein said first ends of said pump and recovery fibers are formed into a first composite fiber which is coupled to an input end of said amplifying fiber, wherein said second ends of said pump and recovery fibers are formed into a second composite fiber coupled to an output end of said amplifying fiber, and wherein pump light is inserted from said source thereof into said cladding via said M pump fibers and is received from said amplifier cladding and reinserted into said amplifier cladding via said N recovery fibers.

8. The apparatus of claim 7, wherein said source of pump light includes M diode-laser emitters each thereof delivering light into a second end of a corresponding one of said M pump fibers.

9. The apparatus of claim 8, wherein M is 2 and N is 4.

10. The apparatus of claim 7, wherein said pump and recovery fibers are multimode fibers.

11. The apparatus of claim 7, wherein at least one of said first and second composite fibers includes a bundled region wherein the fibers thereof are bundled and fused together, the bundled region extending to a tapered region, said tapered region tapering to a minimum diameter about equal to the diameter of said amplifier fiber, the minimum diameter of said tapered region being coupled to said amplifying fiber.

12. The apparatus of claim 7, wherein at least one of said first and second composite fibers includes a bundled region wherein the fibers thereof are bundled and fused together, the bundled region extending to a tapered region, said tapered region tapering to a minimum diameter about equal to the diameter of said amplifier fiber, the minimum diameter of said tapered region being spliced to an intermediate multimode fiber region having about the same diameter as the diameter of said amplifier fiber, and said intermediate multimode fiber region being coupled to said amplifying fiber.

13. The apparatus of claim 6, including M pump fibers and N recovery fibers each of which have first and second ends, wherein said first ends of said pump and recovery fibers are grouped around and optically coupled to said amplifier fiber cladding at a first location on said amplifying fiber, wherein said second end of said pump and recovery fibers are grouped around and optically coupled to a second location on said amplifying fiber, said second location being downstream of said first location in said propagation direction, and wherein pump light is inserted from said source thereof into said cladding via at least one of said M pump fibers and is received from said amplifier cladding and reinserted into said amplifier cladding via one or more of said N recovery fibers.

14. The apparatus of claim 13, wherein said source of pump light includes M diode-laser emitters each thereof delivering light into a second end of a corresponding one of said M pump fibers.

15. Optical apparatus, comprising:

an amplifier fiber having a doped core surrounded by a cladding, said core doping providing optical gain for light propagating therein in a propagation direction when said doped core is energized by pump light absorbed therein;

a pump fiber, arranged to insert pump-light from a source thereof into said cladding of said amplifier fiber such that said pump light propagates through said cladding thereof in a first propagation direction; and a recovery fiber arranged to receive an unabsorbed portion of said propagated pump light from said cladding, and to re-insert said unabsorbed portion of said pump-light into said cladding for re-propagation therein in a second propagation direction opposite to said first propagation direction.

16. The optical apparatus of claim 15, wherein said recovery fiber is terminated by a mirror, and said unabsorbed pump light, after reflection from said mirror is reinserted in said fiber cladding a location thereon at which it is received.

* * * * *